US010461419B2

(12) United States Patent
Duan

(10) Patent No.: US 10,461,419 B2
(45) Date of Patent: Oct. 29, 2019

(54) ANTENNA ADJUSTMENT APPARATUS AND REMOTE ELECTRICAL TILT ANTENNA

(71) Applicant: Huawei Technologies Co., Ltd., Shenzhen (CN)

(72) Inventor: Fangqing Duan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 700 days.

(21) Appl. No.: 15/232,060

(22) Filed: Aug. 9, 2016

(65) Prior Publication Data

US 2016/0352011 A1 Dec. 1, 2016

Related U.S. Application Data

(63) Continuation of application No. PCT/CN2014/071930, filed on Feb. 10, 2014.

(51) Int. Cl.

| | |
|---|---|
| ***F16H 33/00*** | (2006.01) |
| ***F16H 35/00*** | (2006.01) |
| ***F16H 37/00*** | (2006.01) |
| ***H01Q 3/32*** | (2006.01) |
| *H01Q 1/24* | (2006.01) |

(52) U.S. Cl.

CPC ............... *H01Q 3/32* (2013.01); *H01Q 1/246* (2013.01)

(58) Field of Classification Search

CPC ................................ H01Q 3/32; H01Q 1/246

See application file for complete search history.

(56) References Cited

U.S. PATENT DOCUMENTS

| | | | | |
|---|---|---|---|---|
| 3,686,974 | A * | 8/1972 | Little, Jr. | F16H 1/22 192/41 S |
| 4,334,439 | A * | 6/1982 | Kadymir | B23B 39/166 173/50 |
| 8,291,784 | B2 | 10/2012 | Martin et al. | |
| 8,391,926 | B2 | 3/2013 | Seeor et al. | |
| 2003/0177862 | A1 | 9/2003 | Chan | |
| 2010/0201590 | A1* | 8/2010 | Girard | H01Q 1/246 343/766 |
| 2010/0201591 | A1* | 8/2010 | Girard | H01Q 1/246 343/766 |

(Continued)

FOREIGN PATENT DOCUMENTS

| | | | |
|---|---|---|---|
| CN | 1479846 | A | 3/2004 |
| CN | 101521312 | A | 9/2009 |
| CN | 201655964 | U | 11/2010 |

(Continued)

*Primary Examiner* — Jake Cook

(74) *Attorney, Agent, or Firm* — Slater Matsil, LLP

(57) ABSTRACT

Embodiments of the present application provide an antenna adjustment apparatus. The antenna adjustment apparatus includes a first drive wheel, a first gear, a second drive wheel, a second gear, and multiple output gears. The first drive wheel is meshed with the first gear, the second drive wheel is meshed with the second gear, an axis of the second gear coincides with an axis of the first drive wheel, and the output gears are connected to the phase shifters. When the second drive wheel propels the second gear to rotate, the first gear revolves around the axis of the second gear, is selectively meshed with one of the output gears, and is driven by the first drive wheel to propel the output gear to rotate and drive the phase shifter connected to the output gear.

17 Claims, 7 Drawing Sheets

(56) References Cited

U.S. PATENT DOCUMENTS

| | | | |
|---|---|---|---|
| 2013/0252478 | A1 | 9/2013 | Le et al. |
| 2013/0307728 | A1 | 11/2013 | Berger et al. |

FOREIGN PATENT DOCUMENTS

| | | | |
|---|---|---|---|
| CN | 102097681 | A | 6/2011 |
| CN | 102185180 | A | 9/2011 |
| CN | 102496769 | A | 6/2012 |
| CN | 102714354 | A | 10/2012 |
| CN | 102771010 | A | 11/2012 |
| CN | 103329345 | A | 9/2013 |
| CN | 103474774 | A | 12/2013 |
| DE | 102011009600 | B3 | 3/2012 |
| EP | 2253046 | A2 | 11/2010 |
| EP | 2668693 | A1 | 12/2013 |
| WO | 0184016 | A1 | 11/2001 |
| WO | 2006008663 | A1 | 1/2006 |
| WO | 2006123128 | A1 | 11/2006 |
| WO | 2009102774 | A2 | 8/2009 |
| WO | 2011116862 | A1 | 9/2011 |
| WO | 2012149779 | A1 | 11/2012 |

* cited by examiner

ANTENNA ADJUSTMENT APPARATUS AND REMOTE ELECTRICAL TILT ANTENNA

CROSS-REFERENCE TO RELATED APPLICATIONS

This application is a continuation of International Application No. PCT/CN2014/071930, filed on Feb. 10, 2014, which is hereby incorporated by reference in the entirety.

TECHNICAL FIELD

The present application relates to an antenna adjustment apparatus and a remote electrical tilt antenna.

BACKGROUND

In a mobile base station communications system, currently, there are two commonly used manners of adjusting a downtilt angle of an antenna, that is, manual adjustment and electrical adjustment. Compared with the manual adjustment, the electrical adjustment does not require a worker to manually climb a tower or perform operations at an antenna end, presents great convenience, and is easy to implement. At present, especially in a developed area and in a relatively developed area, electrical adjustment gradually becomes a mainstream and is applied more and more widely.

The limitation of mobile base station site resources has resulted in an increasing demand for a multi-band antenna. For the multi-band antenna, currently, a mainstream electrical adjustment manner is that an antenna at each frequency band uses one downtilt angle adjustment apparatus, that is, one multi-band antenna needs multiple downtilt angle adjustment apparatuses. However, because such a downtilt angle adjustment manner of the multi-band antenna needs multiple downtilt angle adjustment apparatuses, an overall size of an antenna downtilt angle adjustment apparatus is large, thereby failing to meet a development trend of miniaturization.

SUMMARY

Embodiments of the present application provide an antenna adjustment apparatus and a remote electrical tilt antenna, which can reduce an overall size of an antenna.

To achieve the foregoing objective, the embodiments of the present application provide the following technical solutions.

According to one aspect, an antenna adjustment apparatus is provided and is configured to adjust a downtilt angle of an antenna assembly, where the antenna assembly includes multiple phase shifters. The antenna adjustment apparatus includes a first drive wheel, a first gear, a second drive wheel, a second gear, and multiple output gears, where the first drive wheel is meshed with the first gear, the second drive wheel is meshed with the second gear, an axis of the second gear coincides with an axis of the first drive wheel, the output gears are connected to the phase shifters, the second drive wheel is configured to propel the second gear to rotate and drive the first gear to revolve around the axis of the second gear, so that the first gear is selectively meshed with one of the output gears, the first drive wheel is configured to propel the first gear to rotate and drive the output gear meshed with the first gear to rotate, and the output gear is configured to propel the phase shifter connected to the output gear.

The second drive wheel is configured to lock the second gear.

The antenna adjustment apparatus further includes multiple output shafts parallel with each other, where the output gears are fixedly connected to the output shafts.

The antenna adjustment apparatus further includes a first rotating shaft, where the first drive wheel is fixedly connected to the first rotating shaft, and the first rotating shaft is parallel with the output shafts.

The second gear is sleeved on the first rotating shaft in a non-contact manner.

The antenna adjustment apparatus further includes a second rotating shaft, where the second drive wheel is fixedly connected to the second rotating shaft, and the second rotating shaft is parallel with the first rotating shaft and the output shafts.

The antenna adjustment apparatus further includes a third rotating shaft, where the first gear is mounted on the third rotating shaft, and the third rotating shaft is parallel with the second rotating shaft, the first rotating shaft, and the output shafts.

The third rotating shaft is connected to the second gear, and the first gear is movably connected to the third rotating shaft.

The antenna adjustment apparatus further includes a first fixture, where the output shafts are mounted on the first fixture.

The antenna adjustment apparatus further includes multiple screws, multiple nuts, and multiple guide rods, where the screws are fixedly connected to the output shafts, the nuts are meshed with the screws and are fixedly connected to the phase shifters, the guide rods are movably connected to the nuts, and the guide rods are mounted on the first fixture.

One end of the output shafts is provided with screw threads, and the antenna adjustment apparatus further includes multiple nuts and multiple guide rods, where the nuts are meshed with the screw threads of the output shafts and are fixedly connected to the phase shifters, the guide rods are movably connected to the nuts, and the guide rods are mounted on the first fixture.

The antenna adjustment apparatus further includes a first drive structure, which is configured to provide driving force for the first drive wheel.

The antenna adjustment apparatus further includes a second drive structure, which is configured to provide driving force for the second drive wheel.

The second drive structure has self-locking torque, which is used to lock the second drive wheel.

According to another aspect, a remote electrical tilt antenna is provided, including an antenna assembly and the antenna adjustment apparatus integrated in the antenna assembly.

The antenna assembly includes a housing, and the antenna adjustment apparatus is mounted in the housing.

The housing is provided with accommodation space, the accommodation space is provided with an opening at one end of the housing, the antenna adjustment apparatus includes a drive apparatus, and the drive apparatus is inserted into the accommodation space through the opening.

According to the antenna adjustment apparatus and the remote electrical tilt antenna provided in the embodiments of the present application, a second drive wheel drives a second gear to rotate to change a position of a first gear, so that the first gear can be meshed with different output gears, that is, the first gear can selectively drive the output gears. Therefore, the antenna adjustment apparatus in the embodiments of the present application can selectively adjust a downtilt angle of an antenna in an antenna assembly, and one antenna adjustment apparatus can adjust downtilt angles of multiple antennas, thereby solving a problem in the prior art that an overall size of an antenna adjustment apparatus is large because multiple antenna adjustment apparatuses are needed to adjust downtilt angles of a multi-band antenna.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present application with reference to the accompanying drawings in the embodiments of the present application.

Referring to FIG. 1 to FIG. 7, an antenna adjustment apparatus 100 provided in the embodiments of the present application is configured to adjust a downtilt angle of an antenna assembly 200. The antenna assembly 200 includes multiple phase shifters, and the phase shifters are connected to the antenna adjustment apparatus 100.

In this implementation manner, the antenna assembly 200 is a multi-band antenna and includes multiple antennas.

Figure 7:
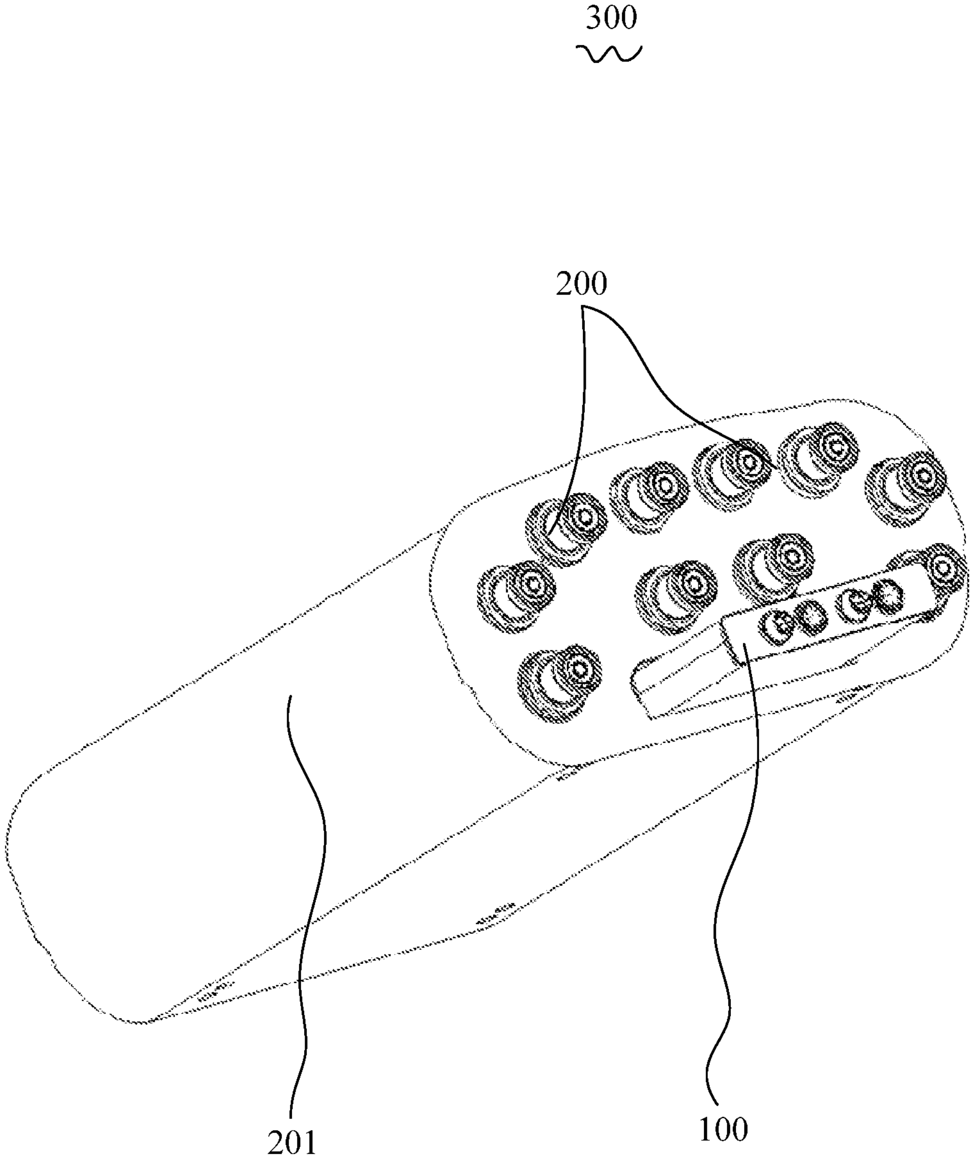
FIG. 7 is a schematic assembly diagram of the antenna adjustment apparatus shown in FIG. 6 and an antenna assembly.

As shown in FIG. 7, in this implementation manner, the antenna assembly 200 includes 5 dual-polarized antennas, and each dual-polarized antenna is provided with one pair of radio frequency interfaces.

In this implementation manner, one antenna corresponds to one phase shifter. In another implementation manner, one phase shifter may correspond to two or more antennas.

Figure 1:
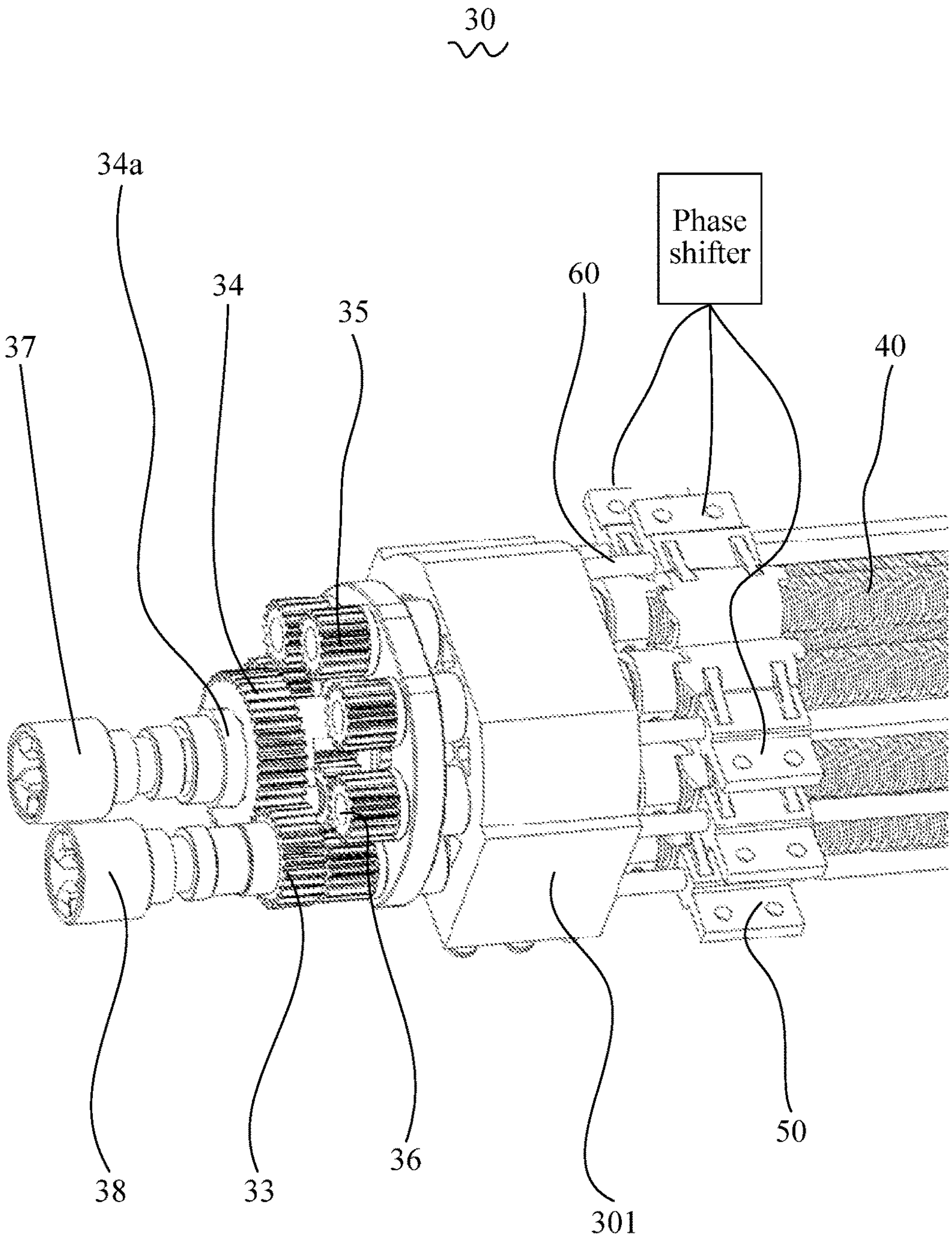
FIG. 1 is a schematic diagram of partial assembly of a transmission apparatus in an antenna adjustment apparatus according to an embodiment of the present application.
Figure 2:
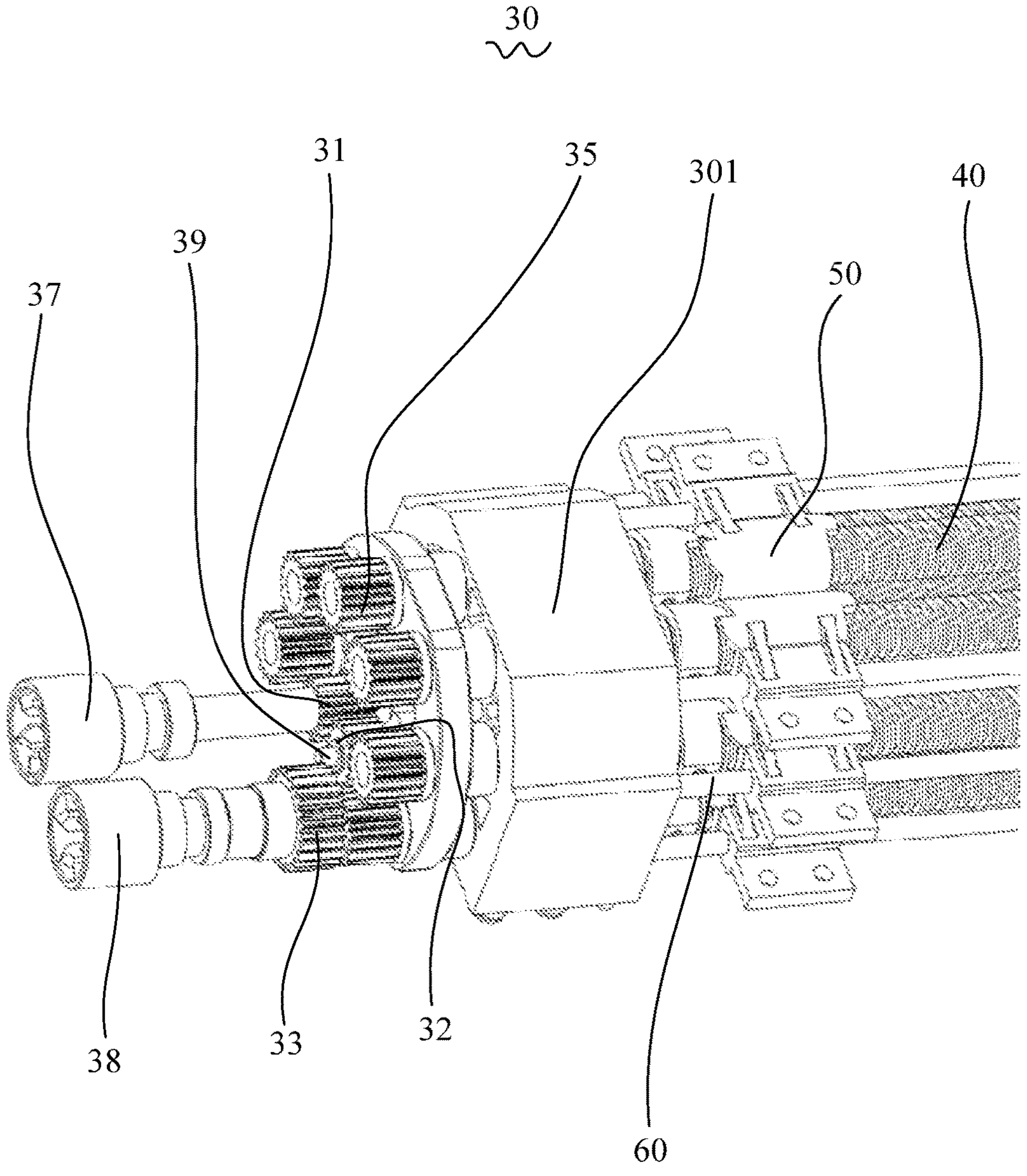
FIG. 2 is a schematic diagram of the partial assembly in FIG. 1.
Figure 3:
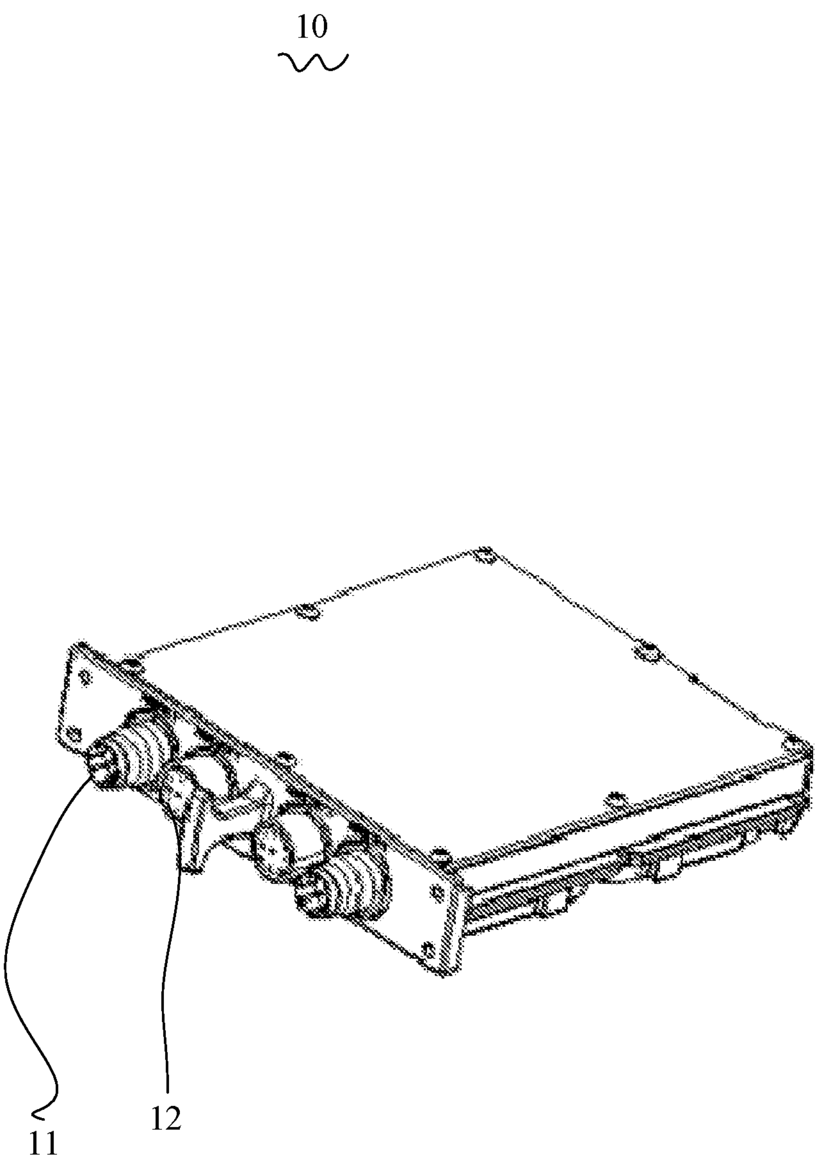
FIG. 3 is a schematic assembly diagram of a drive apparatus in an antenna adjustment apparatus according to an embodiment of the present application.
Figure 4:
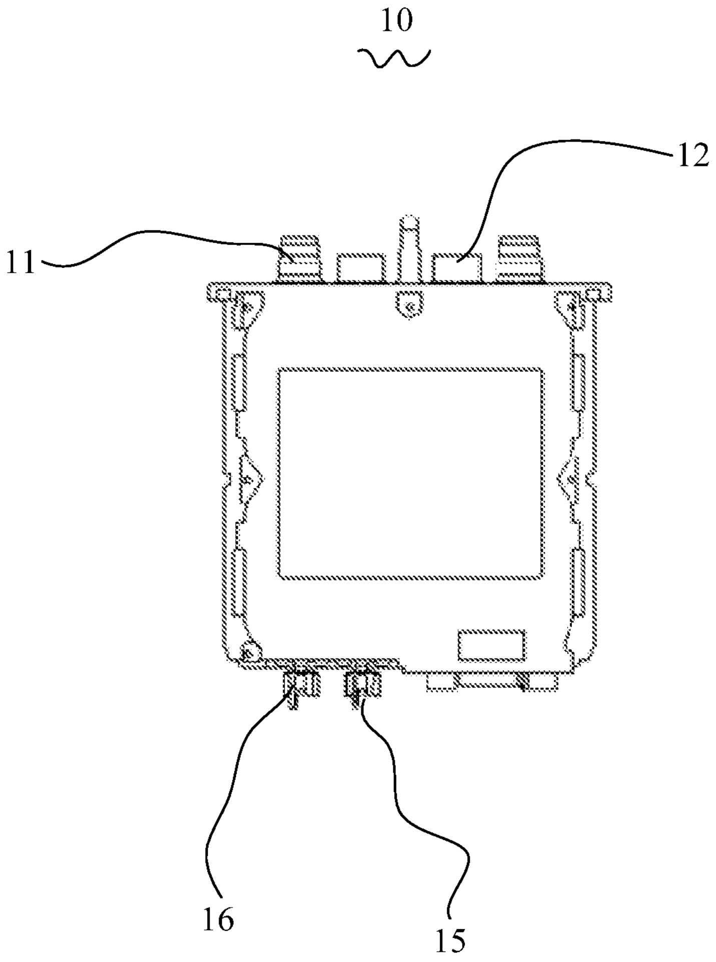
FIG. 4 is a schematic sectional view of the drive apparatus shown in FIG. 3.
Figure 5:
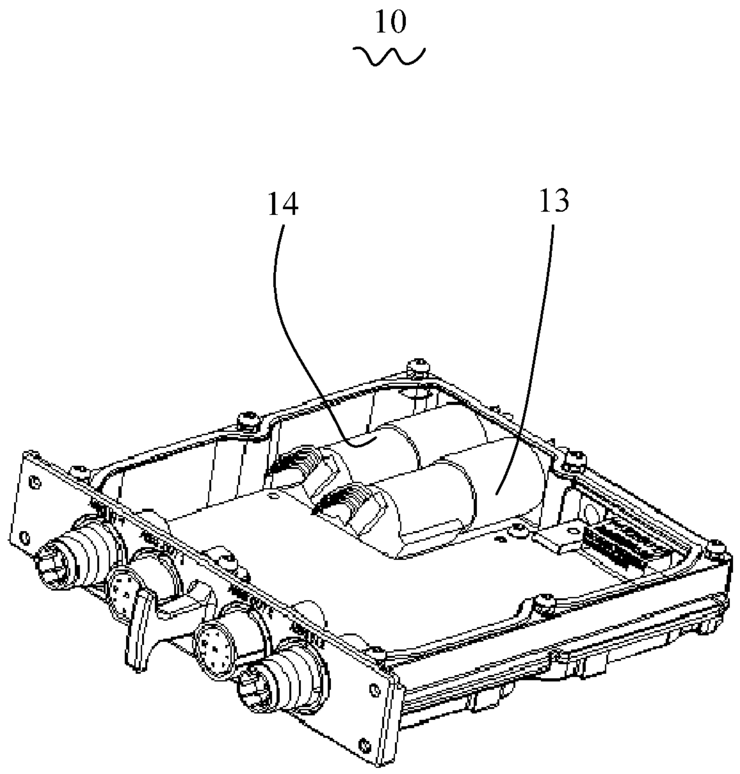
FIG. 5 is a schematic assembly diagram of the drive apparatus shown in FIG. 3 from another perspective.
Figure 6:
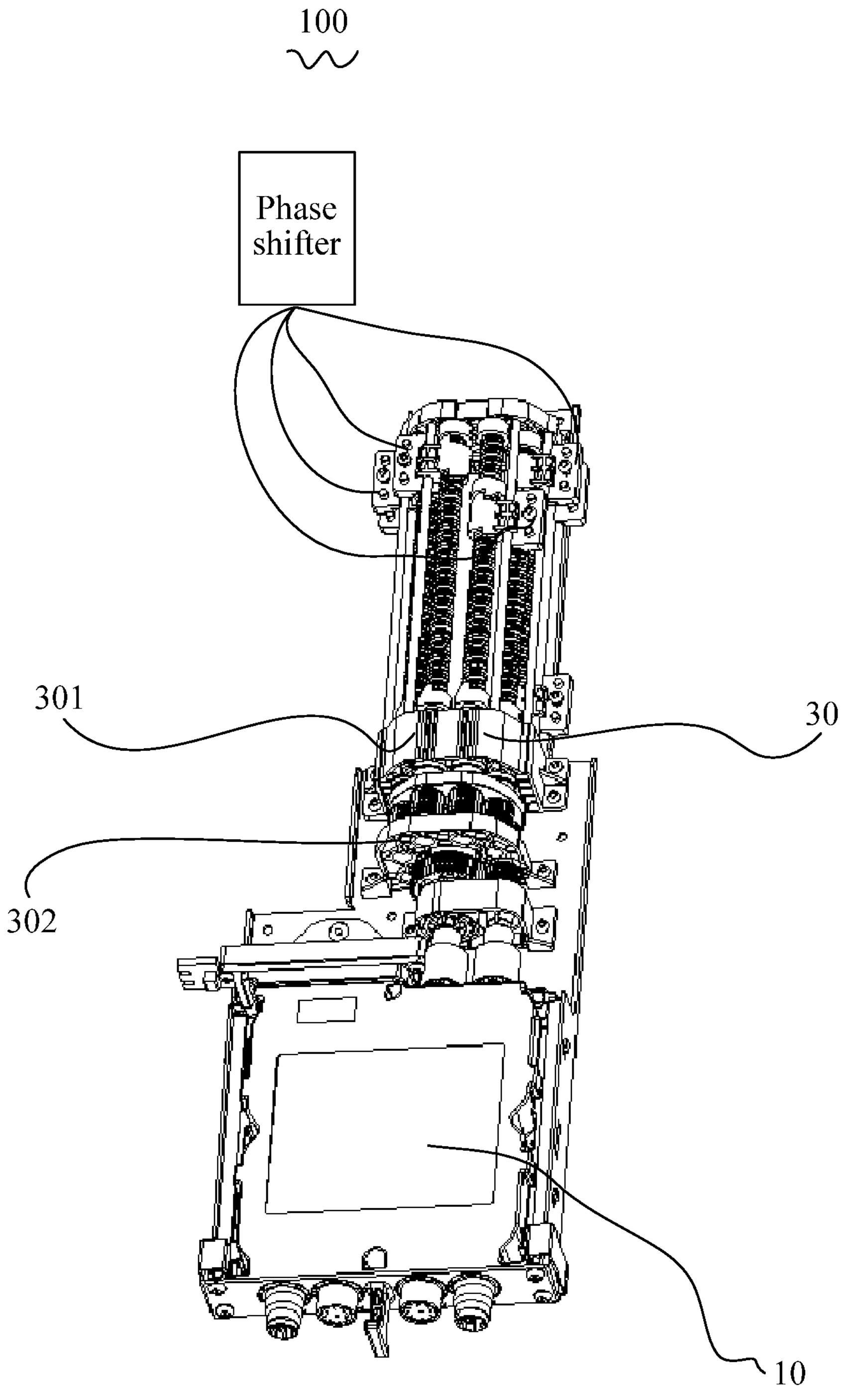
FIG. 6 is a schematic assembly diagram of an antenna adjustment apparatus according to an embodiment of the present application.

As shown in FIG. 1, FIG. 2, and FIG. 6, the antenna adjustment apparatus 100 includes a transmission apparatus 30, and the transmission apparatus 30 includes a first drive wheel 31, a first gear 32, a first rotating shaft 37, a gear carrier 34*a*, a second drive wheel 33, a second gear 34, and multiple output gears 35, where the first drive wheel 31 is meshed with the first gear 32, the second drive wheel 33 is meshed with the second gear 34, an axis of the second gear 34 coincides with an axis of the first drive wheel 31, each of the output gears 35 is connected to each of the phase shifters, the gear carrier 34*a* is sleeved on the first rotating shaft 37, the second gear 34 is fixedly connected to the gear carrier 34*a*, the first gear 32 rotates together with the gear carrier 34*a*, the first gear 32 revolves around the axis of the second gear 34 and is selectively meshed with one of the output gears 35 when the second drive wheel 33 propels the second gear 34 to rotate, the first drive wheel 31 propels the first gear 32 to rotate and drives the output gear 35 meshed with the first gear 32 to rotate, and the output gear 35 drives the phase shifter connected to the output gear 35, so that a downtilt angle of an antenna assembly 200 is changed.

When one of the phase shifters needs to work to adjust a downtilt angle of an antenna connected to the phase shifter, the second drive wheel 33 first propels the second gear 34 to rotate; because the first gear 32 can revolve around the axis of the second gear 34, the first gear 32 can rotate to a position of an output gear 35 corresponding to the phase shifter of the antenna to be adjusted and then is meshed with the output gear; then, the first drive wheel 31 propels the first gear 32 to rotate and drives the output gear 35 meshed with the first gear 32 to rotate, and the output gear 35 drives the phase shifter connected to the output gear 35 to work, so that the downtilt angle of the antenna connected to the phase shifter is changed. In other words, in the antenna adjustment apparatus 100 in the present application, the second drive wheel 33 propels the second gear 34 to rotate to change a position of the first gear 32, so that the first gear 32 can be meshed with different output gears 35, that is, the first gear 32 can selectively drive the output gears 35. Therefore, the antenna adjustment apparatus 100 in the present application can selectively adjust a downtilt angle of an antenna in an antenna assembly 200, and one antenna adjustment apparatus 100 can adjust downtilt angles of multiple antennas, thereby solving a problem in the prior art that an overall size of an antenna adjustment apparatus is large because multiple antenna adjustment apparatuses 100 are needed to adjust downtilt angles of a multi-band antenna.

Further, because one antenna adjustment apparatus 100 can adjust the downtilt angles of multiple antennas, compared with the prior art in which one antenna needs one antenna adjustment apparatus, the present application greatly reduces a quantity of antenna adjustment apparatuses 100 and further greatly lowers manufacturing cost of the antenna adjustment apparatus 100.

Further, because the quantity of antenna adjustment apparatuses 100 is reduced, space required for mounting the antenna adjustment apparatus 100 is also correspondingly reduced.

In this implementation manner, one output gear 35 corresponds to one phase shifter, that is, the phase shifters corresponds to the output gears 35 in a one-to-one correspondence. In addition, one first gear 32 corresponds to multiple output gears 35. In other words, one first gear 32 corresponds to multiple phase shifters, so that the antenna adjustment apparatus 100 in the present application can adjust downtilt angles of multiple antennas.

In another implementation manner, one output gear 35 may correspond to two or more phase shifters.

As a further improvement of the present application, in a process in which the first drive wheel 31 propels the first gear 32 to rotate and drives the output gear 35 meshed with the first gear 32 to rotate, the second gear 34 is locked by the second drive wheel 33 and cannot rotate.

As a further improvement of the present application, when the second drive wheel 33 propels the second gear 34 to rotate and drives the first gear 32 to revolve around the axis of the second gear 34, the first drive wheel 31 propels the first gear 32 to rotate.

Because in the process in which the second drive wheel 33 propels the second gear 34 to rotate and drives the first gear 32 to change the position, the first drive wheel 31 drives the first gear 32 to correspondingly rotate, and the first gear 32 does not propel the output gear 35 to rotate; as a result, the phase shifter connected to the output gear 35 does not work, that is, the downtilt angle of the antenna does not change. In other words, in a process in which the first gear 32 is selectively meshed with the output gear 35, the first gear 32 does not propel the output gear 35 by which the first gear 32 passes to rotate to cause the phase shifter of the antenna corresponding to the output gear 35 to work, and therefore the downtilt angle of the antenna does not change in the process in which the first gear 32 is selectively meshed with the output gear 35.

As shown in FIG. 1 and FIG. 2, as a further improvement of the present application, the antenna adjustment apparatus 100 further includes multiple output shafts 36 parallel with each other, where the output gears 35 are fixedly connected to the output shafts 36.

In this implementation manner, each of the output gears 35 and each of the output shafts 36 form an integrated gear shaft.

In another implementation manner, each of the output gears 35 and each of the output shafts 36 are fastened as a whole in a fitting manner, for example, in a pin-key fitting manner.

As a further improvement of the present application, the first drive wheel 31 is fixedly connected to the first rotating shaft 37, the second gear 34 is mounted on the first rotating shaft 37, and the first rotating shaft 37 is parallel with the output shafts 36.

In this implementation manner, two ends of the gear carrier 34*a* are separately embedded into a first fixture 301 and a second fixture 302, so that the gear carrier 34*a* can be sleeved on the first rotating shaft 37 in a non-contact manner. The two ends of the gear carrier 34*a* are not fixedly connected to the first fixture 301 and the second fixture 302, and diameters of holes, through which the gear carrier 34*a* passes, on the first fixture 301 and the second fixture 302 are slightly greater than diameters of the two ends of the gear carrier 34*a*, so that the gear carrier 34*a* can stably rotate by support of the first fixture 301 and the second fixture 302; in addition, the gear carrier 34*a* is always stably fastened between the first fixture 301 and the second fixture 302.

In this implementation manner, the second gear 34 is sleeved on the first rotating shaft 37 in a non-contact manner by using the gear carrier 34*a*, that is, when the first rotating shaft 37 rotates, the second gear 34 does not rotate together with the first rotating shaft 37. The first drive wheel 31 is fixedly connected to the first rotating shaft 37, that is, when the first rotating shaft 37 rotates, the first drive wheel 31 rotates together with the first rotating shaft 37.

In this implementation manner, the first drive wheel 31 and the first rotating shaft 37 form an integrated gear shaft.

In another implementation manner, the first drive wheel 31 and the first rotating shaft 37 are fastened as a whole in a fitting manner, for example, in a pin-key fitting manner.

As a further improvement of the present application, the antenna adjustment apparatus 100 further includes a third rotating shaft 38, where the second drive wheel 33 is fixedly connected to the third rotating shaft 38, and the third rotating shaft 38 is parallel with the first rotating shaft 37 and the output shafts 36.

In this implementation manner, because the second drive wheel 33 is fixedly connected to the third rotating shaft 38, when the third rotating shaft 38 rotates, the second drive wheel 33 rotates together with the third rotating shaft 38.

In this implementation manner, the second drive wheel 33 and the third rotating shaft 38 form an integrated gear shaft.

In another implementation manner, the second drive wheel 33 and the third rotating shaft 38 are fastened as a whole in a fitting manner, for example, in a pin-key fitting manner.

As a further improvement of the present application, the antenna adjustment apparatus 100 further includes a second rotating shaft 39, where the first gear 32 is mounted on the second rotating shaft 39, and the second rotating shaft 39 is parallel with the third rotating shaft 38, the first rotating shaft 37, and the output shafts 36.

Further, the second rotating shaft 39 is connected to the gear carrier 34*a*, sufficient space is reserved in circumference of the gear carrier 34*a* and is used to accommodate the second rotating shaft 39 and the first gear 32 that is mounted on the second rotating shaft 39. When the second gear 34 rotates, the second rotating shaft 39 rotates together with the second gear 34. The first gear 32 is movably connected to the second rotating shaft 39; when the second rotating shaft 39 rotates together with the second gear 34, the first gear 32 not only rotates around the axis of the second gear 34, but also rotates around the second rotating shaft 39. In this implementation manner, the rotation of the first gear 32 around the axis of the second gear 34 is referred to as revolution, and the rotation of the first gear 32 around the second rotating shaft 39 is referred to as rotation around an axis of the first gear 32.

In this implementation manner, the second rotating shaft 39 is fixedly connected to the second gear 34.

In another implementation manner, the second rotating shaft 39 is movably connected to the second gear 34. Regardless of whether the second rotating shaft 39 is fixedly connected to or movably connected to the second gear 34, when the second gear 34 rotates, the second rotating shaft 39 rotates together with the second gear 34.

As shown in FIG. 1 and FIG. 6, as a further improvement of the present application, the antenna adjustment apparatus 100 further includes a first fixture 301 and a second fixture 302 spaced from the first fixture 301 by a specific distance.

In this implementation manner, the first rotating shaft 37 and the output shafts 36 are mounted on the first fixture 301 and the second fixture 302, and the third rotating shaft 38 is mounted on the second fixture 302.

In another implementation manner, the first rotating shaft 37 and the output shafts 36 are mounted on the first fixture 301, but are not mounted on the second fixture 302; or the first rotating shaft 37 is mounted on the second fixture 302, but is not mounted on the first fixture 301. The third rotating shaft 38 is mounted on the first fixture 301 and the second fixture 302.

As shown in FIG. 1, FIG. 2, and FIG. 6, as a further improvement of the present application, the antenna adjustment apparatus 100 further includes multiple screws 40, multiple nuts 50, and multiple guide rods 60, where the screws 40 are fixedly connected to the output shafts 36, the nuts 50 are meshed with the screws 40 and are fixedly connected to the phase shifters, the nuts 50 are movably connected to the guide rods 60, and the guide rods 60 are mounted on the first fixture 301 and are used to limit rotation of the nuts 50 and guide rectilinear motion of the nuts 50.

When the screws 40 are driven by the output shafts 36 to rotate, rotation of the nuts 50 is limited by the guide rods 60 and the nuts 50 can only move along the guide rods 60 rectilinearly, that is, the nuts 50 move relative to the screws 40. In other words, rotation of the output shafts 36 is converted into the rectilinear motion of the nuts 50 by means of cooperation between the screws 40, the nuts 50, and the guide rods 60, so that the phase shifters fixedly connected to the nuts 50 work, thereby implementing adjustment of the downtilt angles of the antenna assembly 200.

In another implementation manner, each of the screws 40 and each of the output shafts 36 are formed as a whole, that is, each of the screws 40 and each of the output shafts 36 are integrated into a whole; one end of the output shafts 36 is provided with screw threads and the other end of the output shafts 36 is provided with the output gears 35. Alternatively, each of the screws 40, each of the output shafts 36, and each of the output gears 35 are integrated into a whole.

As shown in FIG. 3 to FIG. 7, as a further improvement of the present application, the antenna adjustment apparatus 100 further includes a drive apparatus 10, where the drive apparatus 10 receives a control signal and a power supply from a mobile communications base station, and propels a transmission apparatus 30 to work, so that a phase shifter of the antenna assembly 200 is propelled to work, thereby implementing adjustment of a downtilt angle of the antenna assembly 200.

Further, the drive apparatus 10 includes a first interface 11 and a second interface 12, where both the first interface 11 and the second interface 12 can receive the control signal and the power supply from the mobile communications base station. The first interface 11 is a male connector, and the second interface 12 is a female connector. When a connector connected to the drive apparatus 10 is a male connector, the second interface 12 is used; when a connector connected to the drive apparatus 10 is a female connector, the first interface 11 is used. In other words, regardless of whether the connector connected to the drive apparatus 10 is the male connector or the female connector, the drive apparatus 10 can receive the control signal and the power supply from the mobile communications base station, thereby facilitating the use.

In this implementation manner, the drive apparatus 10 is provided with two groups of interfaces, where one is a group of standby interfaces. Each group of interfaces includes the first interface 11 and the second interface 12.

In another implementation manner, the drive apparatus 10 may also be provided with only one group of interfaces or only one interface.

Further, the drive apparatus 10 further includes a first drive structure 13 and a second drive structure 14, where the first drive structure 13 is configured to provide driving force for the first rotating shaft 37 and the first drive wheel 31. The second drive structure 14 is configured to provide driving force for the third rotating shaft 38 and the second drive wheel 33.

In this implementation manner, both the first drive wheel 31 and the second drive structure 14 are motors.

Specifically, the second drive structure 14 has self-locking torque. In the process in which the first drive wheel 31 propels the first gear 32 to rotate and propels the output gear 35 meshed with the first gear 32 to rotate, because a motor driving the third rotating shaft 38 has self-locking torque and locks the third rotating shaft 38, the motor further locks the second drive wheel 33 fixedly connected to the third rotating shaft 38, and locks the second gear 34 by locking the second drive wheel 33 meshed with the second gear 34, thereby ensuring that a meshing relationship between the first gear 32 and the output gear 35 is not changed. In this way, the first drive wheel 31 propels the first gear 32 to rotate, propels the output gear 35 meshed with the first gear 32 to rotate, and drives the phase shifter to work, and therefore a downtilt angle of an antenna corresponding to the phase shifter is changed. In other words, during adjustment of the downtilt angle of the antenna, because the second drive structure 14 has the self-locking torque, the second gear 34 is locked; in the process in which the first drive wheel 31 propels the first gear 32 to rotate, the meshing relationship between the first gear 32 and the output gear 35 is not changed.

Further, the drive apparatus 10 includes a first output interface 15 and a second output interface 16, where the first output interface 15 is connected to the first rotating shaft 37, and the second output interface 16 is connected to the third rotating shaft 38, that is, the drive apparatus 10 is connected to the transmission apparatus 30 by using the first output interface 15 and the second output interface 16, so that the drive apparatus 10 is connected to the transmission apparatus 30 by means of insertion.

As shown in FIG. 1 to FIG. 7, during mounting, the first rotating shaft 37, the third rotating shaft 38, the second rotating shaft 39, and the output shafts 36 are mounted on the first fixture 301 and the second fixture 302, both the first drive wheel 31 and the second gear 34 are mounted on the first rotating shaft 37, the second drive wheel 33 is mounted on the third rotating shaft 38 and is meshed with the second gear 34, the first gear 32 is mounted on the second rotating shaft 39 and is meshed with the first drive wheel 31, and the output gears 35 are mounted on the output shafts 36; then, the screws 40 are fastened to the output shafts 36, the nuts 50 are meshed with the screws 40, the guide rods 60 are fastened to the first fixture 301, and the nuts 50 are slidably connected to the guide rods 60. In this way, the first fixture 301, the second fixture 302, the first rotating shaft 37, the third rotating shaft 38, the second rotating shaft 39, the output shafts 36, the first drive wheel 31, the first gear 32, the second drive wheel 33, the second gear 34, the multiple output gears 35, the screws 40, the nuts 50, and the guide rods 60 are assembled into the transmission apparatus 30. Then, the first rotating shaft 37 is connected to the first output interface 15, and the third rotating shaft 38 is connected to the second output interface 16. In this way, the drive apparatus 10 and the transmission apparatus 30 are assembled into the antenna adjustment apparatus 100.

In practice, firstly, a control signal is received and a power supply is switched on, that is, the drive apparatus 10 receives, through the first interface 11 or the second interface 12, the control signal and the power supply from the mobile communications base station, so that the first drive structure 13 and the second drive structure 14 work. Secondly, an output gear 35 with an output requirement is selected, that is, an antenna whose downtilt angle needs to be adjusted is selected according to an indication of the control signal, and the output gear 35 is selected according to a phase shifter of the antenna whose downtilt angle needs to be adjusted, where the process is as follows: the second drive structure 14 propels the third rotating shaft 38 connected to the second output interface 16 to rotate, and the second drive wheel 33 is linked with the third rotating shaft 38 and propels the second gear 34 meshed with the second drive wheel 33 to rotate, to drive the second rotating shaft 39 connected to the gear carrier 34*a* to rotate, and compel the first gear 32 mounted on the second rotating shaft 39 to rotate to a position of the output gear 35 with the output requirement and to be meshed with the output gear 35. Finally, the downtilt angle of the antenna is adjusted, where the process is as follows: the first drive structure 13 propels the first rotating shaft 37 connected to the first output interface 15 to rotate, the first drive wheel 31 is linked with the first rotating shaft 37 and drives the first gear 32 to rotate, to propel the output gear 35 meshed with the first gear 32 to rotate, and the screw 40 rotates accordingly; in addition, the nut 50 rectilinearly moves relative to the guide rod 60, and the phase shifter fixedly connected to the nut 50 works accordingly, thereby changing the downtilt angle of the antenna.

Because the first gear 32 can be selectively meshed with the output gears 35, the phase shifters of the antenna assembly 200 can selectively work, so that the antenna adjustment apparatus 100 in the present application can selectively adjust a downtilt angle of an antenna in the antenna assembly 200, that is, one antenna adjustment apparatus 100 can adjust downtilt angles of multiple antennas. In other words, because the first gear 32 in the present application can selectively drive the output gears 35, the antenna adjustment apparatus 100 in the present application can adjust the downtilt angles of multiple antennas, that is, one antenna adjustment apparatus 100 can adjust downtilt angles of multiple antennas in the present application, instead of adjusting a downtilt angle of only one antenna in the prior art, thereby solving a problem in the prior art that an overall size of an antenna adjustment apparatus 100 is large because there are too many antenna adjustment apparatuses 100.

Referring to FIG. 7, the present application further provides a remote electrical tilt antenna 300. The remote electrical tilt antenna 300 includes the foregoing antenna adjustment apparatus 100 and antenna assembly 200, where the antenna assembly 200 is provided with a housing 201, the housing 201 is provided with accommodation space (shielded by the antenna adjustment apparatus 100), and the accommodation space is provided with an opening (shielded by the antenna adjustment apparatus 100) at one end surface of the housing 201. During mounting, the transmission apparatus 30 of the antenna adjustment apparatus 100 is fastened inside the housing 201, and the drive apparatus 10 of the antenna adjustment apparatus 100 is inserted into the accommodation space through the opening and is connected to the transmission apparatus 30, that is, the drive apparatus 10 of the antenna adjustment apparatus 100 can be mounted in the housing 201 of the antenna assembly 200 by means of insertion.

Because the drive apparatus 10 can be mounted in the housing 201 of the antenna assembly 200 by means of insertion, if the drive apparatus 10 is faulty when being used, for example, the first drive structure 13 and/or the second drive structure 14 (referring to FIG. 5) is faulty, a user can remove the drive apparatus 10 from the accommodation space through the opening, so as to maintain or replace the drive apparatus 10. In other words, during maintenance or replacement of the drive apparatus 10, the whole remote electrical tilt antenna 300 does not need to be disassembled, that is, the drive apparatus 10 can be maintained or replaced without a need to dissemble the antenna assembly 200, so that it is more convenient to maintain the remote electrical tilt antenna 300, and the user can use the antenna more conveniently.

Further, because the antenna adjustment apparatus 100 is mounted in the housing 201 of the antenna assembly 200, that is, the antenna adjustment apparatus 100 and the antenna assembly 200 are integrated into a whole, a structure of the remote electrical tilt antenna 300 is more compact, thereby meeting a development trend of miniaturization.

Moreover, the remote electrical tilt antenna 300 in the present application can adjust downtilt angles of all antennas in the antenna assembly 200 by using only one antenna adjustment apparatus 100. Therefore, a quantity of the antenna adjustment apparatuses 100 and space required for installing the antenna adjustment apparatus 100 are reduced, and a volume of the remote electrical tilt antenna 300 is further reduced, thereby solving a problem in the prior art that a size of the remote electrical tilt antenna 300 is large because multiple antenna adjustment apparatuses 100 are needed to adjust downtilt angles of a multi-band antenna. In addition, because the quantity of the antenna adjustment apparatuses 100 is reduced, manufacturing cost of the antenna adjustment apparatus 100 is also greatly reduced, and therefore manufacturing cost of the remote electrical tilt antenna 300 is also reduced.

The foregoing descriptions are exemplary implementation manners of the present application. It should be noted that a person of ordinary skill in the art may make certain improvements and polishing without departing from the principle of the present application and the improvements and polishing shall fall within the protection scope of the present application.

What is claimed is:

1. An antenna adjustment apparatus, configured to adjust a downtilt angle of an antenna assembly;

wherein the antenna assembly comprises a plurality of phase shifters;

wherein the antenna adjustment apparatus comprises:

a first drive wheel, a first rotating shaft;

a gear carrier;

a first gear;

a second drive wheel;

a second gear; and a plurality of output gears;

wherein the first drive wheel is meshed with the first gear;

wherein the second drive wheel is meshed with the second gear, and an axis of the second gear coincides with an axis of the first drive wheel;

wherein the plurality of output gears are connected to the plurality of phase shifters in a one-to-one correspondence manner;

wherein the gear carrier is sleeved on the first rotating shaft;

wherein the second gear is fixedly connected to the gear carrier;

wherein the first gear is configured to rotate together with the gear carrier;

wherein the second drive wheel is configured to propel the second gear to rotate and drive the first gear to revolve around the axis of the second gear, so that the first gear is selectively meshed with one of the plurality of output gears; and wherein the first drive wheel is configured to propel the first gear to rotate and drive the output gear meshed with the first gear to rotate, and the output gear is configured to propel the phase shifter connected to the output gear.

2. The antenna adjustment apparatus according to claim 1, wherein the second drive wheel is further configured to lock the second gear.

3. The antenna adjustment apparatus according to claim 1, wherein the antenna adjustment apparatus further comprises a plurality of output shafts disposed in a parallel manner, wherein the output gears are fixedly connected to the plurality of output shafts, and the plurality of output shafts is disposed in manner such that each output shaft is parallel with the axis of the first drive wheel.

4. The antenna adjustment apparatus according to claim 3, wherein the first drive wheel is fixedly connected to the first rotating shaft, and the first rotating shaft is parallel with the plurality of output shafts.

5. The antenna adjustment apparatus according to claim 4, wherein the antenna adjustment apparatus further comprises a second rotating shaft, the first gear is movably connected to the second rotating shaft, and wherein the second rotating shaft is connected to the gear carrier and configured to rotate together with the second gear, so that the first gear is configured to rotate together with the second gear.

6. The antenna adjustment apparatus according to claim 5, wherein the second rotating shaft is parallel with the first rotating shaft and the plurality of output shafts.

7. The antenna adjustment apparatus according to claim 6, wherein the antenna adjustment apparatus further comprises a third rotating shaft, the second drive wheel is fixedly connected to the third rotating shaft, and the third rotating shaft is parallel with the first rotating shaft, the second rotating shaft, and the plurality of output shafts.

8. The antenna adjustment apparatus according to claim 3, wherein the antenna adjustment apparatus further comprises a first fixture, and the plurality of output shafts are mounted on the first fixture.

9. The antenna adjustment apparatus according to claim 8, wherein the antenna adjustment apparatus further comprises a plurality of screws, a plurality of nuts, and a plurality of guide rods, wherein the plurality of screws is fixedly connected to the plurality of output shafts, the plurality of nuts is meshed with the plurality of screws and is fixedly connected to the plurality of phase shifters, the plurality of guide rods is movably connected to the plurality of nuts, and the plurality of guide rods is mounted on the first fixture.

10. The antenna adjustment apparatus according to claim 8, wherein one end of the plurality of output shafts is provided with screw threads, the antenna adjustment apparatus further comprises a plurality of nuts and a plurality of guide rods, the plurality of nuts is meshed with the screw threads of the plurality of output shafts and are fixedly connected to the plurality of phase shifters, the plurality of guide rods are movably connected to the nuts, and the plurality of guide rods is mounted on the first fixture.

11. The antenna adjustment apparatus according to claim 1, wherein the antenna adjustment apparatus further comprises a first drive structure, configured to provide driving force for the first drive wheel.

12. The antenna adjustment apparatus according to claim 1, wherein the antenna adjustment apparatus further comprises a second drive structure, configured to provide driving force for the second drive wheel.

13. The antenna adjustment apparatus according to claim 12, wherein the second drive structure has self-locking torque, configured to lock the second drive wheel.

14. A remote electrical tilt antenna, comprising an antenna assembly, wherein the remote electrical tilt antenna further comprises an antenna adjustment apparatus integrated in the antenna assembly, wherein the antenna adjustment apparatus comprises:

a first drive wheel;
a first rotating shaft;
a gear carrier;
a first gear;
a second drive wheel;
a second gear; and
a plurality of output gears;
wherein the first drive wheel is meshed with the first gear;
wherein the second drive wheel is meshed with the second gear, and an axis of the second gear coincides with an axis of the first drive wheel;
wherein the plurality of output gears are connected to a plurality of phase shifters in a one-to-one correspondence manner;
wherein the gear carrier is sleeved on the first rotating shaft;
wherein the second gear is fixedly connected to the gear carrier;
wherein the first gear is configured to rotate together with the gear carrier;
wherein the second drive wheel is configured to propel the second gear to rotate and drive the first gear to revolve around the axis of the second gear, so that the first gear is selectively meshed with one of the plurality of output gears; and
wherein the first drive wheel is configured to propel the first gear to rotate and drive the output gear meshed with the first gear to rotate, and the output gear is configured to propel the phase shifter connected to the output gear.

15. The remote electrical tilt antenna according to claim 14, wherein the antenna assembly comprises a housing, and the antenna adjustment apparatus is mounted in the housing.

16. The remote electrical tilt antenna according to claim 15, wherein the housing is provided with accommodation space, the accommodation space is provided with an opening at one end of the housing, the antenna adjustment apparatus further comprises a drive apparatus, and the drive apparatus is inserted into the accommodation space through the opening.

17. A method, comprising:

providing a first drive wheel, a first rotating shaft, a gear carrier, a first gear, a second drive wheel, a second gear, and a plurality of output gears, wherein the first drive wheel is meshed with the first gear, the second drive wheel is meshed with the second gear, and an axis of the second gear coincides with an axis of the first drive wheel; and
connecting the plurality of output gears to a plurality of phase shifters in a one-to-one correspondence manner;
wherein the gear carrier is sleeved on the first rotating shaft;
wherein the second gear is fixedly connected to the gear carrier;
wherein the first gear is configured to rotate together with the gear carrier;
wherein the second drive wheel is configured to propel the second gear to rotate and drive the first gear to revolve around the axis of the second gear, so that the first gear is selectively meshed with one of the plurality of output gears; and
wherein the first drive wheel is configured to propel the first gear to rotate and drive the output gear meshed with the first gear to rotate, and the output gear is configured to propel the phase shifter connected to the output gear.

* * * * *